United States Patent
Valvo et al.

(10) Patent No.: US 7,292,534 B2
(45) Date of Patent: Nov. 6, 2007

(54) METHOD AND DEVICE FOR PROVIDING A MINIMUM CONGESTION FLOW OF ETHERNET TRAFFIC TRANSPORTED OVER A SDH/SONET NETWORK

(75) Inventors: Gaetano Valvo, Milan (IT); Pierluigi Viganò, Besana Brianza (IT); Guido Zancaner, Busto Arsizio (IT)

(73) Assignee: Alcatel, Paris (FR)

( * ) Notice: Subject to any disclaimer, the term of this patent is extended or adjusted under 35 U.S.C. 154(b) by 969 days.

(21) Appl. No.: 10/355,021

(22) Filed: Jan. 31, 2003

(65) Prior Publication Data

US 2003/0161270 A1 Aug. 28, 2003

(30) Foreign Application Priority Data

Feb. 22, 2002 (EP) .................................. 02290445
Aug. 8, 2002 (EP) .................................. 02291993

(51) Int. Cl.
H04J 3/14 (2006.01)
H04L 12/56 (2006.01)
(52) U.S. Cl. ...................................... 370/235; 370/252
(58) Field of Classification Search ...................... None
See application file for complete search history.

(56) References Cited

U.S. PATENT DOCUMENTS 5,812,528 A * 9/1998 VanDervort .................. 370/235
6,122,281 A 9/2000 Donovan et al.
6,917,630 B1 * 7/2005 Russell et al. .............. 370/532
2001/0043603 A1 11/2001 Yu

FOREIGN PATENT DOCUMENTS

EP 0 924 901 A2 6/1999
EP 0 982 900 A2 3/2000
WO WO 01/15363 A1 3/2001

OTHER PUBLICATIONS

Armstrong T et al: "GFP For Ethernet" Contribution to T1 Standards project, XX, XX, Jul. 10, 2000, pp. 1-6, XP000949000.
"Series G: Transmission Systems and Media, Digital Systems and Networks Types and Characteristics of SDH network Protection architectures" ITU-T Recommendation G.841, XX, XX, Oct. 1998, p. COMPLETE XP000955617.

* cited by examiner

Primary Examiner—Andrew C. Lee
Assistant Examiner—Clemence Han
(74) Attorney, Agent, or Firm—Sughrue Mion, PLLC

(57) ABSTRACT

A method for providing a minimum congestion flow of Ethernet traffic that is transported through a pipe from a sending point to a receiving point over a synchronous network. The synchronous network comprises network elements, fiber connections connecting the network elements and virtual containers. The transport is managed through a new layer over the synchronous network physical layer, wherein the new layer comprises access points, links of access point pairs and circuits, which are the possible routes for connecting a pair of access points. A delay marker is generated, the a time frame is calculated based on the delay marker, and a congestion of the circuit is estimated based on the time frame.

15 Claims, 2 Drawing Sheets

METHOD AND DEVICE FOR PROVIDING A MINIMUM CONGESTION FLOW OF ETHERNET TRAFFIC TRANSPORTED OVER A SDH/SONET NETWORK

INCORPORATION BY REFERENCE OF PRIORITY DOCUMENT

This application is based on, and claims the benefit of, European Patent Applications No. 02290445.2 filed on Feb. 22, 2002 and 02291993.0 filed on Aug. 8, 2002, which are incorporated by reference herein.

BACKGROUND OF THE INVENTION

1. Field of the Invention

The present invention relates to the telecommunication field and in particular to the transport of Ethernet frames over a transport SDH/SONET network. Still more in particular, the present invention relates to a method and device for providing a minimum delay dispatching of Ethernet traffic frames over the SDH/SONET network.

As it is known, traffic generated by an Ethernet apparatus is characterized by discontinuities, namely there are periods with a more or less constant sending rate of Ethernet packets and periods during which a rather long time is provided between a received Ethernet frame and the next one. Such unstable/inconstant traffic is generally termed "bursty". On the contrary, SDH or SONET traffic is characterized by a constant sending/receiving rate. In other words, any network element of a transport SDH/SONET network sends corresponding frames with a regular and constant rate. Furthermore, Ethernet frames do not have a fixed length/size but only a maximum size (1518 bytes).

It is easy to understand that these discrepancies result in a highly difficult interfacing of two technologies having different natures/characteristics.

2. Description of the Prior Art

An already available solution to the above problem allows the mapping of Ethernet frames into SDH/SONET Virtual Containers as a transparent tributary; all incoming bits are transported to the output interface with the related timing information (frequency for recovering the proper bit rate at the reception side). Within the SDH/SONET payload also the dead times between a received Ethernet frame and the following one are mapped.

The general problem of transporting Ethernet frames over a SONET/SDH transport network is presently solved through SONET/SDH virtual concatenation. Ethernet frame transport is performed according to the following main steps: the bytes of one frame are distributed among all the available SDH/SONET Virtual Containers, namely, the first frame byte is mapped in the first VC, the second frame byte is mapped in the second VC and so on; due to the fact that SDH/SONET Virtual Containers can follow different paths, at the ending point, the Virtual Containers should be realigned; and the bytes of the Ethernet frames are extracted from the realigned Virtual Containers and the frame is finally re-assembled.

At present, when Ethernet traffic is transported over SDH/SONET networks, some queues of Ethernet frames are required. The Ethernet frames should be transported over SDH/SONET network through point-to-point connections. As a point-to-point connection could be accomplished by means of different routes connecting the starting and ending points, the problem to solve is to find the best route in terms of transport and network performances.

As far as the inventors are aware, there is no known solution to this problem and the frames are transmitted through fixed point-to-point connections, regardless whether the resources which are intended for the transport are overused and some other resources (which could provide a reduced dispatching time) are underused.

The above problem could become even worst when there is a fault of the SDH/SONET Virtual Containers transporting the Ethernet frames. At present, faults are managed according to the relevant SDH/SONET Recommendations but, in many case, a fault affecting a Virtual Container assigned to the transport of Ethernet frames leads to a complete loss of the traffic.

SUMMARY OF THE INVENTION

In view of the above main problem, the general object of the present invention is overcoming it in an efficient manner.

The main object of the present invention is providing a method and device which is able to find out the minimum delay route for dispatching frames from a starting point to an ending point. The minimum delay dispatching feature results in being particularly advantageous when the network capacity is reduced because of a fault of one or more VCs.

An additional object of the present invention is providing such a method that could be implemented in hardware.

The above and further objects of the present invention are obtained by a method according to claim 1 and from a device according to claim 10. Further advantageous features of the present invention are set forth in respective dependent claims. All the claims should be considered as an integral part of the present description.

The basic and general idea of the proposed solution is to assign the frame to the Circuit that can perform the transport with the minimum delay.

The Link transmitter continuously monitors the congestion of every Circuit and assigns every frame to the current fastest Circuit according to the last available congestion evaluation. The application of the minimum delay criterion leads to the best possible balance among all the available Circuits; the congestion of all the Circuits should be more or less the same. The optimisation of Circuit congestion leads to the optimisation of network congestion too.

The present invention operates through a new layer/network which is provided over the SDH/SONET network in order to manage the transport of Ethernet traffic over SDH/SONET network; this new layer/network uses the resources of SDH/SONET network in such a way as to optimize the provided services and the performances with reference to this specific type of transport. Such a new layer has been fully disclosed and claimed in a previous patent application (EP02290445.2) of the same applicant. The content of it is fully incorporated herewith as a reference.

BRIEF DESCRIPTION OF THE DRAWINGS

The present invention will become clear in view of the following detailed description, to be read having reference to the attached sheets of drawings, wherein.

BEST MODE FOR CARRYING OUT THE INVENTION

As said above, the present invention operates in a layer/network which is termed NETS (i.e. Network of Ethernet Transport over SDH/SONET) and is disclosed in EP02290445.2 The NETS comprises basic elements that are listed below for a better comprehension of the present invention.

Figure 1:
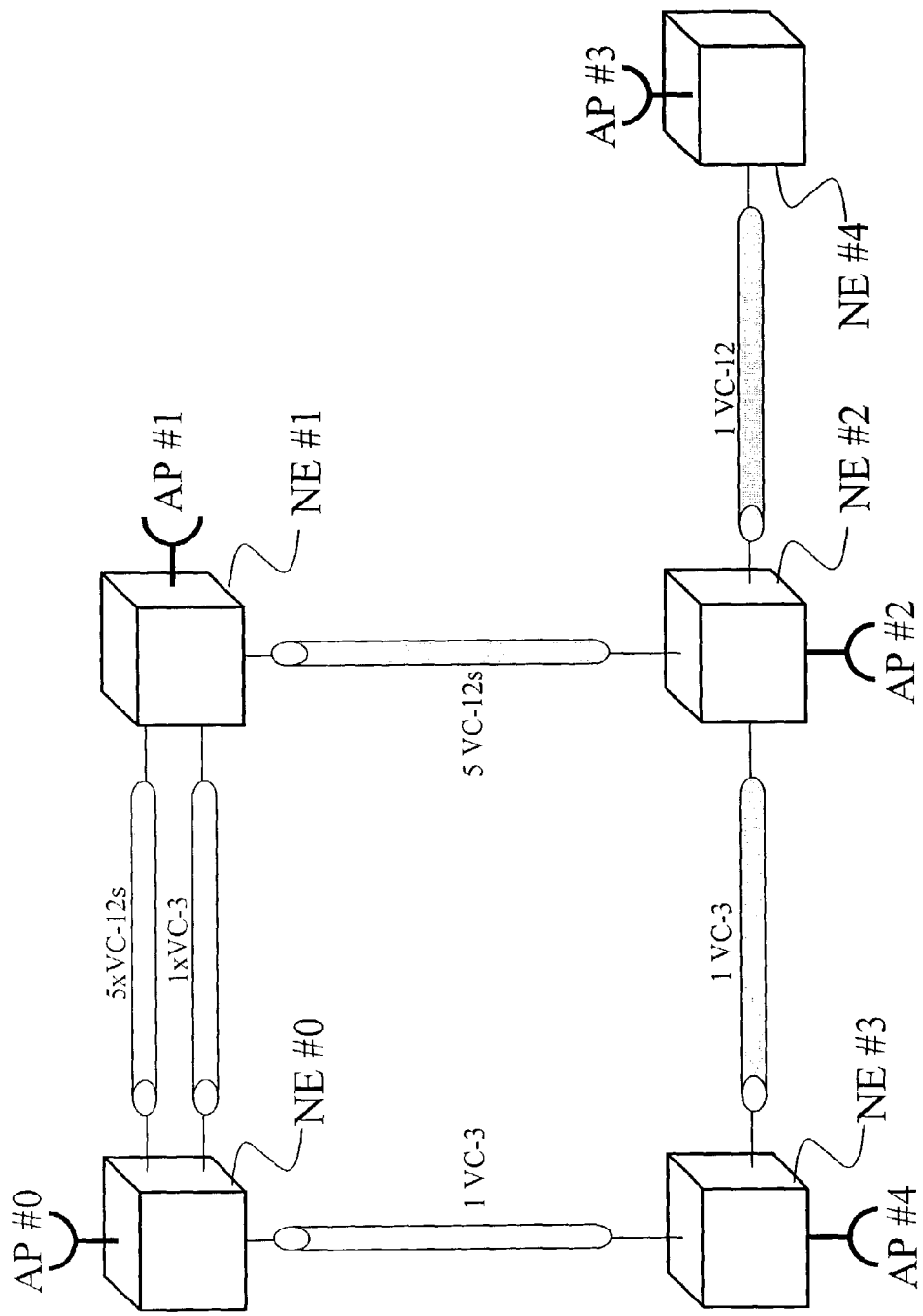
FIG. 1 shows the structure of a exemplifying Virtual Private Network.

The NETS model comprises five basic elements: Access Point, Link, Circuit, Pipe and Path. An Access Point (AP) is an Ethernet interface at the boundary of an SDH/SONET network; it is the point where the Ethernet traffic can access/leave the SDH/SONET network. FIG. 1 depicts a simple example of network comprising five Network Elements (NE #0 to NE #4) with each network element having an Access Point: NE #0 has AP #0, NE #1 has AP #1, NE #2 has AP #2, NE #3 has AP #4 and finally NE #4 has AP #3. Naturally, a Network Element can host more than one Access Point.

A pair of Ethernet Access Points defines a point-to-point connection; this connection is named Link. For instance, with reference to FIG. 1, the pair AP #0 & AP #1 identifies a link; the pair AP #2 & AP #4 defines another link, and so on.

An SDH/SONET network could allow for the connection of two Access Points (i.e. to accomplish a Link) by means of different routes; every route is named Circuit. A Circuit is obtained by a Pipe concatenation and could be considered as a series connection of N Pipes.

In its turn, every Circuit/route that connects two Access Points can be divided into a sequence of smaller segments; every segment is named Pipe.

The basic pipeline is the Virtual Container that connects two Network Elements; it is named Path.

With reference to FIG. 1, there are two direct routes made up by 5×VC-12 and 1×VC-3, respectively, that connect AP #0 and AP #1; the first route is named Circuit A and the second one is named Circuit B. Many other routes can connect the two Access Points but, for the aim of this example, just two of them are sufficient.

Figure 2:
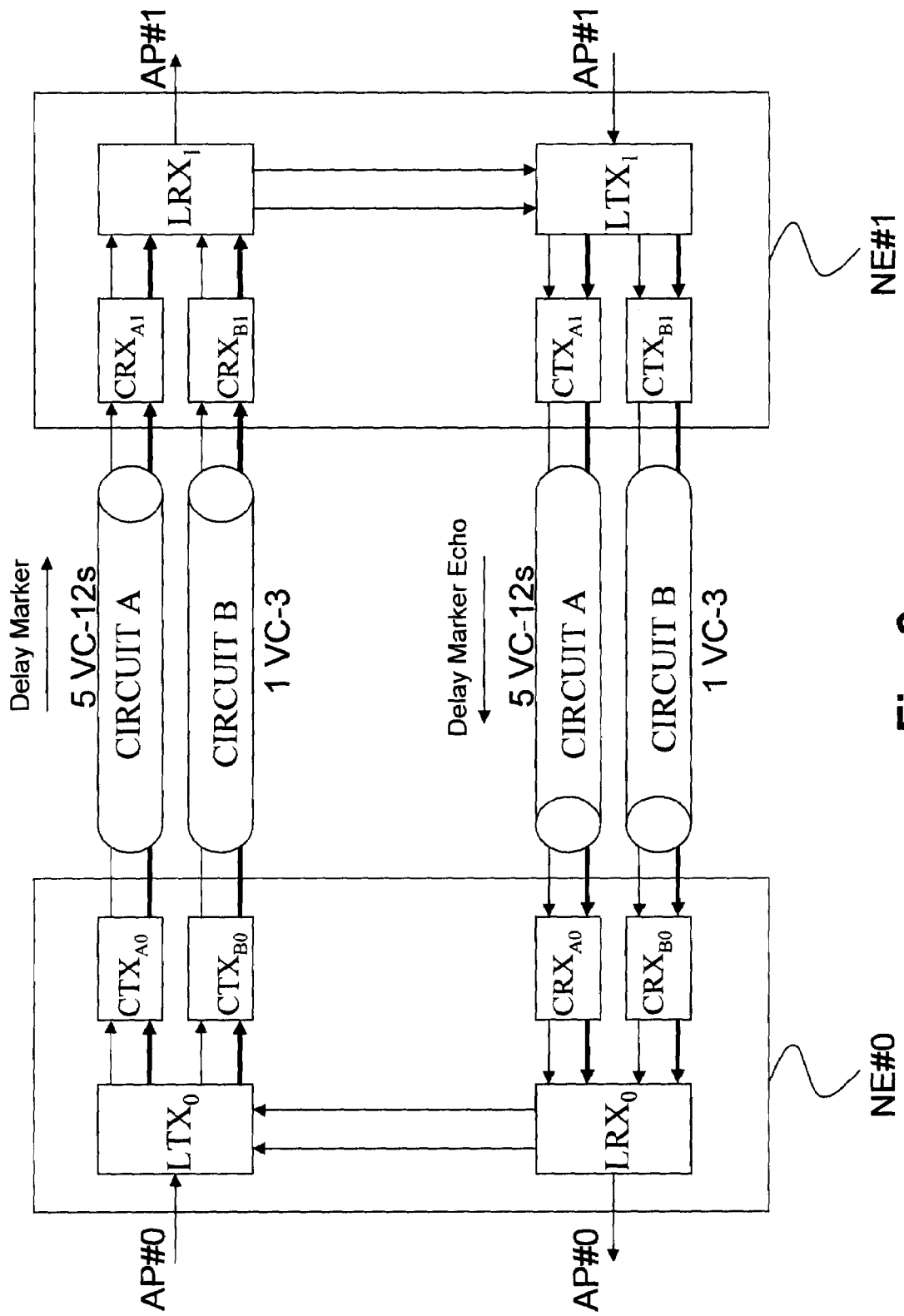
FIG. 2 highlights a Link, with two related Circuits, selected from the network of FIG. 1.

FIG. 2 highlights the selected Link with the two related Circuits. The direction from NE #0 to NE #1 will be considered first; of course the solution is applied to both directions.

Ethernet frames received at AP #0 are stored in the queue of the Link transmitter $LTX_0$ of NE #0. Every frame has to be assigned either to Circuit A (VC-12 based) or to Circuit B (VC-3 based) to be transported over SDH/SONET network to the destination Network Element.

A frame assigned to a Circuit is stored in the related TX queue ($CTX_{A0}$, $CTX_{B0}$), transported by means of available Virtual Containers through the SDH network, stored in the RX queue ($CRX_{A0}$, $CRX_{B0}$) of the Circuit and then provided to the Link receiver $LRX_1$.

FIG. 2 does not depict the SDH/SONET nodes (like ADMs or XCs) of the network that does not perform the mapping/de-mapping of Ethernet traffic into SDH Virtual Containers.

The basic and general idea of the proposed solution is to assign the frame to the Circuit that can perform the transport with the minimum delay.

The Link transmitter $LTX_0$ continuously monitors the congestion of every Circuit and assigns every frame to the current fastest Circuit according to the last available congestion evaluation. The application of the minimum delay criterion leads to the best possible balance among all the available Circuits; the congestion of all the Circuits should be more or less the same. The optimisation of Circuit congestion leads to the optimisation of network congestion too.

The measurement of Circuit congestion by Link transmitter $LTX_0$, $LTX_1$ is mono-directional; the Link transmitter $LTX_0$ of NE #0 has to measure the congestion of Circuit A just along the direction NE#0-NE#1. Similarly, the Link transmitter $LTX_1$, of NE #1 has the task to measure the congestion along the opposite direction, namely from NE#1 to NE#0.

According to a preferred embodiment of the present invention, a delay marker is provided to a Circuit transmitter; advantageously, a delay marker is a bit that has to be transported along the Circuit with an Ethernet frame of the TX queue or a dedicated frame should the TX queue be empty.

The task of this bit is to measure the Circuit delay, i.e. its congestion, along the direction from Link transmitter to Link receiver (for instance, from $LTX_0$ to $LRX_1$).

Every time the Link transmitter provides a delay marker to a Circuit, a timer is started; when this timer is stopped it will provide the measure of the Circuit congestion. The timer is stopped upon receipt of the previously sent delay marker.

With more specific reference to FIG. 2, let suppose that the Link transmitter $LTX_0$ of NE #0 provides the delay marker to Circuit A through $CTX_{A0}$. Circuit A transports the delay marker to destination. The transport delay of the delay marker along Circuit A (from Link transmitter $LTX_0$ of NE #0 to Link receiver $LRX_1$ of NE #1) is the same as for an Ethernet frame because both of them are stored in the same queues and transported along the same route.

As soon as the Link receiver $LRX_1$ of NE #1 receives the delay marker from $LTX_0$, it provides an echo of the delay marker to the Link transmitter $LTX_1$ of NE#1. Such an echo of the delay marker is forwarded back to NE#0 along the opposite direction (from NE #1 to NE #0) by using the same Circuit A (and/or the other circuit B, if available).

The task of this echo delay marker is to stop the timer of Link transmitter $LTX_0$ in order to have an idea about the Circuit A congestion.

The delay of the echo delay marker along the return direction can not be avoided but two constraints should be complied with for a more precise information. In principle, the delay of the echo along the return direction should be as short as possible; shorter the return delay, more precise the measure. Furthermore, this return delay should be the same for every Circuit; in such a way it affects the congestion measure for different Circuits in the same way.

In order to satisfy both these constraints, the echo of the delay marker is transmitted along the return direction in the following way:

The delay marker echo has a priority higher than the one of queues of frames and skips all possible stored frames. In such a way, the echo delay is decreased.

The echo is transmitted along the return direction by means of all the available Circuits (Circuits A and B in FIG. 2). The Link transmitter stops the timer after the first reception of the echo independently of the return Circuit that has provided it; this decreases the echo's delay again and should guarantee that the return delay should be more or less the same independently of the Circuit under measurement.

As already stated, the Link transmitter stops the timer upon reception of the first received echo; the value of the stopped timer provides a measure of Circuit congestion.

Possibly, an average value of the Circuit congestion is calculated by taking into account a number N of last measures of the congestion itself.

The steps of: issuing a delay marker at the Link transmitter; providing it to Circuit transmitter; receiving it at the Circuit receiver; providing it to Link Receiver; sending an echo delay marker back to the Link transmitter which issued the delay marker; calculating the Circuit congestion; and calculating an average value of Circuit congestion are continuously repeated for every Circuit.

Thus, when the Link transmitter $LTX_0$ has to assign a frame to a Circuit, it applies the minimum delay criterion according to the following steps:

i. Obtaining the average value of a Circuit congestion. This delay is considered a basic delay that can not be avoided;
ii. Calculating (by the Link transmitter) the transport delay of the frame along this Circuit in the absence of any congestion. This is the delay requested to transport the frame along the Circuit when the network is unloaded. The frame length (e.g. number of bytes) is divided by the Circuit capability (e.g. bytes per second) and the result is the requested delay (in seconds). For instance, if a frame of 256 bytes is considered, the "unloaded" transport delay of Circuit A is higher than the delay of Circuit B because the transport capability of the latter one is more or less five times the capability of Circuit A (a VC-3 against 5×VC-12).
iii. Estimating the future new congestion of the Circuit by adding the current average congestion and the "unloaded" transport delay of the frame.
iv. Repeating steps i. to iii. for every available Circuit.
v. Assigning the frame to the Circuit with the minimum estimation of the future congestion.

Advantageously, the present invention does not simply apply the minimum delay criterion by taking into account the current congestion of all the available Circuits; profitably, it also takes into account how the current condition would be modified by assigning the frame to a Circuit or to another one.

In principle, the Access Points AP #0 and AP #1 of the above example could be connected also by Circuit C that represents the route NE #0-NE #3-NE #2-NE #1. But Circuit C differs from Circuits A and B at least for two main reasons, namely because of the presence of two intermediate nodes (NE #3 and NE #2) and for the circuit capability.

Every intermediate node provides a queue of frames that increases the Circuit delay. It is clear that an intermediate node affects the "delay marker" just in terms of a longer delay but the present invention can be applied without any problem.

Circuit C is made up by the sequence VC-3NC-3/5×VC-12; different types of Virtual Containers are used and it is not so clear what is the capability of the Circuit. An average capability is considered just to see the Circuit as a pipeline of a fixed section instead of a sequence of pipelines with different sections; again the proposed solution can be applied.

The main advantage of the present invention, as already stated, is that the best possible balance among all the Circuits of a Link could be obtained.

All the Circuits should provide more or less the same congestion/delay, thus avoiding bottlenecks. This feature also results in a limitation of the skew among frames transported along different Circuits.

The advantages at network level will become also clearer by considering that a Virtual Container can be shared among different Circuits/Links.

The VC-3 connecting NE #3 and NE #2 is a part of Circuit C of AP #0-AP #1 link but it can be used as a circuit for AP #2 link too.

A high congestion along this Virtual Container represents a bottleneck for both the Links (and the network); the present invention avoids/limits these conditions by distributing the traffic among the network resources in a homogeneous way.

The result is an optimisation of the bandwidth of the complete network.

There have thus been shown and described a novel method and a novel device which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

The invention claimed is:

1. A method for providing a minimum congestion flow of Ethernet traffic that is transported through a pipe from a sending point to a receiving point over a synchronous network, the synchronous network comprising network elements, fiber connections connecting the network elements and virtual containers, the transport being managed through a new layer over a synchronous network physical layer, the new layer comprising access points, links of access points pairs and circuits, which are the possible routes for connecting a pair of access points, wherein the method comprises:
generating a delay marker at a sending point;
transmitting the delay marker to a receiving point and back to the sending point through the circuits;
calculating a time frame for the sending point to receive back the delay marker;
estimating a congestion of the circuits according to the time frame for receiving back the delay marker; and
assigning said Ethernet traffic to be transported in said synchronous network to at least one of said circuits having the minimum estimation of said congestion.

2. The method according to claim 1, wherein the generating the delay marker, the transmitting the delay marker, the calculating the time frame and the estimating the congestion are performed for all the possible circuits connecting the delay marker sending point and receiving point.

3. The method according to claim 1, wherein the generating the delay marker at the sending point comprises, generating the delay marker at a link transmitter of the sending point and starting a timer.

4. The method according to claim 3, wherein transmitting the delay marker to the receiving point and back to the sending point through the circuits comprises, generating a delay marker echo at a link receiver of the receiving point, forwarding the delay marker echo to a link transmitter of the receiving point, transporting the delay marker echo to a link receiver of the sending point and receiving the delay marker echo at the link transmitter of the sending point, to stop the timer.

5. The method according to claim 4, wherein transporting the delay marker echo to the link receiver of the sending point comprises sending the same delay marker echo through all available circuits and skipping any possible queues of frames in order to reduce the delay of the echo as much as possible.

6. The method according to claim 1, further comprising, calculating an average value of the circuits congestion based on a number of congestion measurements for a same circuit.

7. The method according to claim 6, further comprising, calculating an unloaded transport delay of the circuits by dividing a number of frame bytes by a circuit capability.

8. method according to claim 7, wherein a future new congestion of the circuits is estimated by summing the average value of the circuit congestion with an unloaded transport delay.

9. method according to claim 8, wherein an Ethernet frame to be transported in the synchronous network is assigned to a circuit with a minimum estimation of the future new congestion.

10. The method according to claim 1, wherein the new layer comprises access points, links of access point pairs and circuits, which are the possible routes for connecting a pair of access points; and wherein the new layer is a model which resides over the SDH or SONET network and manages ethernet traffic using resources of the SDH or SONET network.

11. The method according to claim 1, wherein the delay marker is a bit in an Ethernet frame.

12. The method according to claim 1, wherein the delay marker echo is a bit in an Ethernet frame.

13. A device for minimum congestion transporting of Ethernet frame signals in a synchronous network, the synchronous network comprising network elements and fiber connections connecting the network elements, the device comprising:

at least one access point for receiving and outputting Ethernet frame signals;

a router of the received Ethernet frame signals to at least one link, wherein the link is a pair of Ethernet access points providing a point-to-point connection in the network;

a sender of frames to available circuits, wherein the circuits are possible routes connecting the pair of Ethernet access points through the network; and an encapsulator which encapsulates the Ethernet frame signals into at least one Virtual Container of a selected available Path, wherein said router generates a delay marker which is transmitted to a receiving point and back to a sending point through the circuits;

wherein a calculator calculates a time frame for the sending point to receive back the delay marker;

an estimator estimates a congestion of the circuits based on the time frame for receiving back the delay marker; and an assignor which assigns said Ethernet traffic to be transported in said synchronous network to at least one of said circuits having the minimum estimation of said congestion.

14. A device according to claim 13, wherein said router generates a delay marker further comprise a timer that is started when the delay marker is generated or sent.

15. The device according to claim 14, further comprising a link receiver for generating a delay marker echo to be forwarded to a link transmitter of the receiving point, to be transported to a link receiver of the sending point and finally to a link transmitter at the sending point, to stop the timer.

* * * * *